US Patent Number: 4,683,849
Date of Patent: Aug. 4, 1987

Brown

[54] RECIPROCATING MULTICYLINDER VEE MACHINES WITH SECONDARY COUNTERBALANCERS

[76] Inventor: Arthur E. Brown, R.D. #1, Box 1107, Lake George, N.Y. 12845

[21] Appl. No.: 673,393

[22] Filed: Nov. 20, 1984

[51] Int. Cl.[4] ............................................. F02B 75/06
[52] U.S. Cl. ........................... 123/192 B; 123/1.92 R; 74/603
[58] Field of Search ....................... 123/192 B, 192 R; 74/603, 604

[56] References Cited

U.S. PATENT DOCUMENTS

| | | | |
|---|---|---|---|
| 1,163,832 | 12/1915 | Lanchester | 123/192 B |
| 1,898,459 | 2/1933 | Newcomb | 123/192 B |
| 2,974,541 | 3/1961 | Dolza | 123/192 B |
| 3,402,707 | 9/1968 | Heron | 123/192 B |
| 3,903,995 | 9/1975 | Irgens | 123/192 B |
| 4,290,395 | 9/1981 | Sakano | 123/192 B |
| 4,414,934 | 11/1983 | Vogel | 123/192 B |

Primary Examiner—Carl Stuart Miller

[57] ABSTRACT

An engine is disclosed in which two cylinders or guideways are mounted in a Vee or L formation with a reciprocable piston or crosshead in each. Connecting rods interconnect each reciprocable member to a crankshaft. Countershafts with balance weights thereon are referred to as balance shafts and these are driven at twice crankshaft speed in opposite directions and they serve to counterbalance the secondary reciprocating inertia forces. The balance shafts are mounted substantially parallel to the crankshaft instead of at right angles to the crankshaft as taught by Lanchester in a Vee machine. Thus, ordinary gearing can be used to drive the balance shafts instead of the skew gearing taught by Lanchester in a Vee machine. When the angle between the two cylinders is 90 degrees, only two not four balance shafts are required. When the machine has four cylinders in a 90 degree Vee, only two parallel balance shafts are required to serve all four cylinders. For some applications, three balance shafts are used.

7 Claims, 15 Drawing Figures

RECIPROCATING MULTICYLINDER VEE MACHINES WITH SECONDARY COUNTERBALANCERS

INTRODUCTION

A 90 degree Vee two cylinder machine (engine, compressor, or pump) already and prior to my invention has the following four advantages over either a two cylinder in-line machine—or a two cylinder balanced opposed machine:

1. The primary reciprocating inertia forces are balanced.
2. The two connecting rods ride close to each other side by side on a single crankpin; and thus the unbalanced force couple due to such con rod spacing is relatively small.
3. Only one crankpin is needed to serve two cylinders and thus the crankshaft is shorter and the overall machine is shorter. Further, the crankshaft cost less with only one crank instead of two.
4. The torque effort is smoother (particularly in a double acting machine) because the two pistons move 90 degrees out of phase with each other instead of reaching the end of a stroke at the same time.

In view of the above four prior advantages, the two cylinder 90 degree Vee machine is superior for many applications and thus it is desirable to further improve the balancing of such a machine.

DISCUSSION OF PRIOR ART

In FIGS. 12 and 13 of U.S. Pat. No. 1,163,832, Lanchester provided secondary counterbalancing for use in a 90 degree Vee two cylinder machine; but Lanchester taught the use of balance shafts a and b placed at right angles to the crankshaft instead of parallel to the crankshaft.

The right angle shafts a and b of Lanchester are awkward and more expensive to mount on bearings and they do not fit well in the crankcase as can be seen in Lanchester's FIGS. 12 and 13. Further, Lanchester used the "skew" gears h, h', g, and g' to drive his right angled balance shafts a and b; as described on page 3, lines 82 to 88 in his patent.

Skew (or screw) gearing is highly inferior for this application due to all that sliding of the teeth (high friction) and the necessity of a one to two speed increase. To operate screw gearing as a speed increaser is like operating a worm gear set in reverse with the worm wheel driving the worm (a high friction situation with a lot of tooth sliding, steep pressure angles, and thrust loads on bearings).

For a reference on skew (or screw) gearing, refer to chapter 31, pages 522 to 527 of "Machine Design" by Dr. V. L. Maleev, First Edition (Revised), the International Textbook Company, Scranton, Pa. Dr. Maleev on page 522 said screw gears are suitable only for the transmission of light power at moderate speeds; and when used as a speed increaser, they are subject to rapid wear.

Thus, the skew gears shown in FIGS. 12 and 13 of Lanchester go against all three recommendations set forth by Dr. Maleev, which are: (1) the speed could be substantial, expecially in an engine or compressor; (2) The forces could be substantial, especially if a spring/mass torsional vibration effect set in; and (3) worst of all the skew gearing of Lanchester is used as a one to two speed increaser.

For actual test data (including efficiency) and speed ratings on screw gearing, contact the TOL-O-Matic Company at 1028 South Third Street, Minneapolis, Minn. 55415 who manufacture "FLOAT-A-SHAFT RIGHT ANGLE GEAR DRIVES". Screw gears are fine for their particular use.

I know of no actual hardware in use anywhere in the world using the Lanchester skew gear drive balancer in a Vee machine. Perhaps the reasons given herein are why.

Turning next to FIG. 1 of Lanchester, balance shafts a and b are parallel to the crankshaft and ordinary gear wheels g and h are used. If a person skilled in the art were to apply to FIG. 1 teaching of Lanchester to a two cylinder 90 degree Vee machine, then four parallel balance shafts would be used (two for each cylinder). The Applicant—through invention—reduces the number of parallel balance shafts to two (in some cases, three) in a Vee machine.

OBJECTS AND ADVANTAGES OF THIS INVENTION

1. As explained in the INTRODUCTION, the two cylinder 90 degree Vee machine has those four prior major advantages; and thus it is desirable to improve such a superior machine still further.

Therefore the first object of this invention is to provide practical and workable secondary balancing for use in a two cylinder 90 degree Vee machine.

2. A related object is to take a two cylinder 90 degree Vee machine and provide balance shafts which are parallel to the crankshaft instead of at right angles to the crankshaft (as shown by Lanchester). Thus the parallel shafts can be driven with ordinary gearing and it is not necessary to use the high friction skew gears shown in FIGS. 12 and 13 of Lanchester. Further, the parallel shafts fit better into a crankcase and made for a simpler bearing arrangement; and the overall machine is more viable.

3. Another object and advantage of this invention is that only two (not four) parallel balance shafts are needed for secondary balancing in a 90 degree Vee (or L) two cylinder machine. The need and use of only two such shafts (instead of four) cuts down on cost and overall size.

4. Since balancing is accomplished with only two parallel balance shafts (instead of four), this reduces the amount of gearing to drive same. It also leads to a more compact and viable arrangement of parts for the whole machine.

5. Another object of this invention is to teach where the parallel balance shaft should be located (in relation to the crankshaft and cylinders in a Vee machine) in order to provide correct balancing of the secondary inertia forces. All drawings show proper shaft locations.

6. Another object is to teach the direction each balance weight should be oriented (in timed relation with the crankshaft) for proper balancing of the secondary inertia forces. All drawings show proper orientation.

7. Another object is to provide formulas so as to teach the size of each balance weight for proper balancing. Formulas are provided.

8. Another object of this invention is to provide secondary balancing in a four cylinder 90 degree Vee machine (as shown in FIGS. 5 to 8) using only two balance shafts. This minimizes the number of parts and cost.

9. Another object is to provide secondary balancing in a four cylinder 90 degree Vee machine wherein the cranks are either at 90 degrees to each other (FIG. 7) or in-line (FIG. 8).

10. Another object is to provide alternate locations for parallel balance shafts in a two cylinder 90 degree Vee machine (as shown in FIGS. 9 and 10).

11. Another object is to provide secondary counterbalancing for a two cylinder machine wherein the Vee angle between cylinders is not 90 degrees but is instead an angle such as 45 degrees (as shown in FIG. 11).

12. Another object is to provide novel toothed belt (or chain) and sprocket drives for the balance shafts as shown in FIGS. 12 and 13.

BRIEF DESCRIPTION OF THE DRAWINGS

FIG. 4 illustrates one of the best uses of the invention.

Throughout the drawings, identical parts have the same reference number.

DETAILED DESCRIPTION OF FIGS. 1, 2, AND 3

Figure 1:
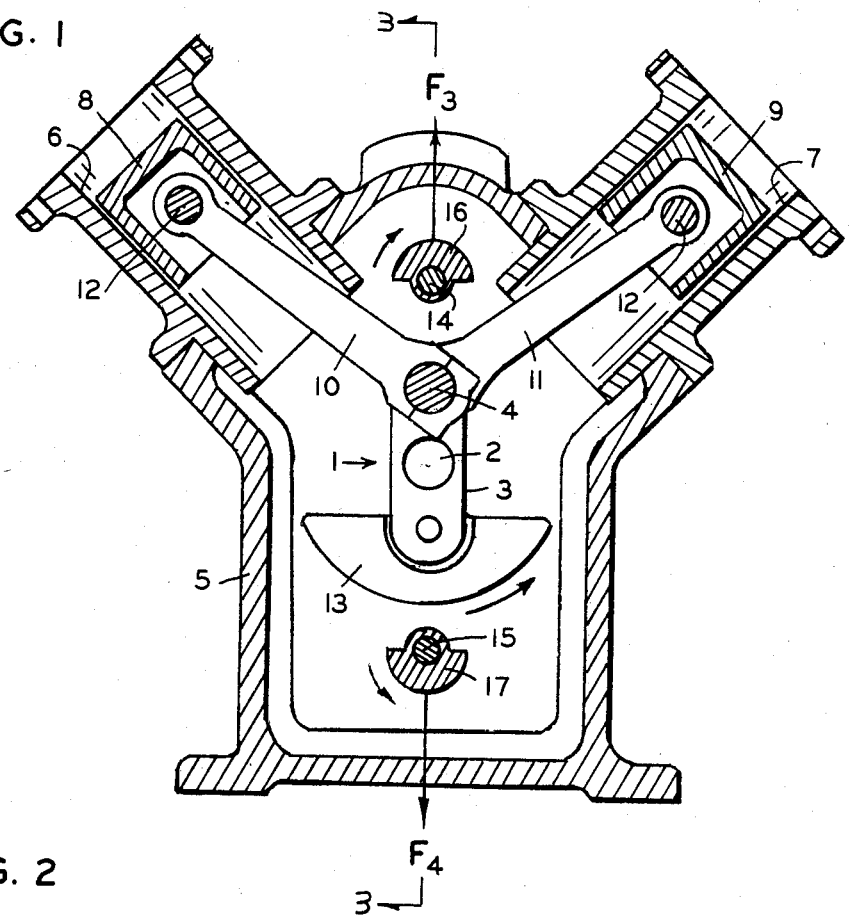
FIG. 1 is a section view showing a 90 degree Vee two cylinder machine with two balance shafts. The section is taken perpendicular to the crankshaft and along the axes of the two cylinders. Cylinder heads are removed in all the drawings.

The crankshaft 1 with main bearing shaft 2, crankarms 3, and crankpin 4 are mounted for rotation in the housing or casing structure 5. The two cylinders 6 and 7 have their centerlines disposed in a 90 degree Vee. The pistons 8 and 9 reciprocate in their respective cylinders. The con rods 10 and 11 interconnect the pistons (via wrist pins 12) to the crankpin 4 for respective reciprocating and rotary motion. The main counterweights 13 are attached to the crankarms 3 and rotate therewith.

Balance shafts 14 and 15 are mounted for rotation parallel to the crankshaft, equidistant therefrom, and in a plane lying half way in between the axes of the two cylinders 6 and 7. Balance weights 16 and 17 are attached to the balance shafts and rotate therewith.

Figure 3:
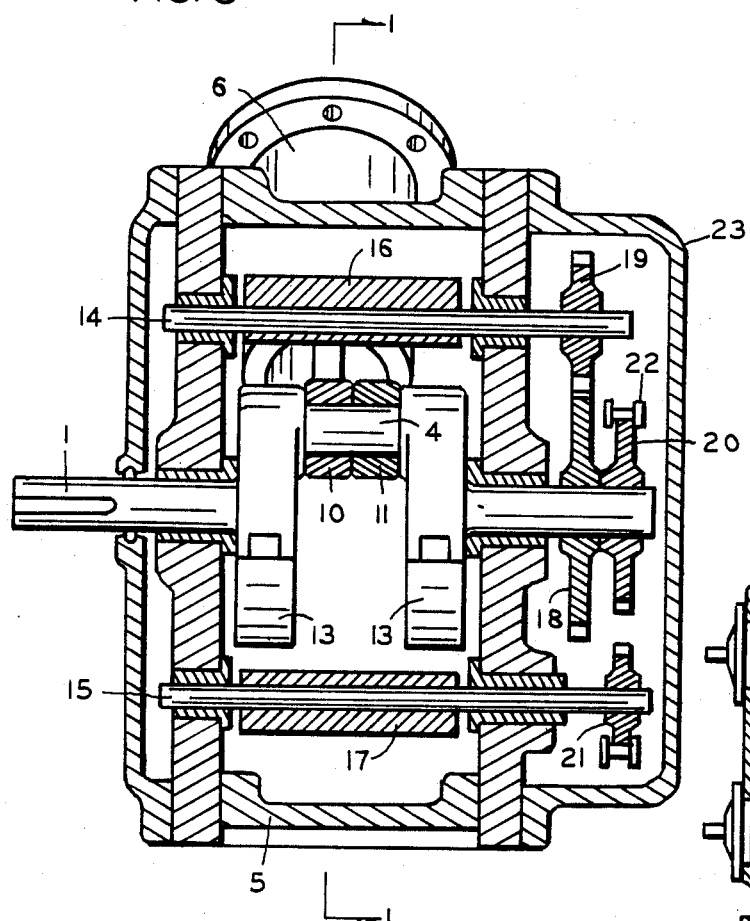
FIG. 3 is a longitudinal section view taken along the lines 3—3 on FIG. 1.
Figure 4:
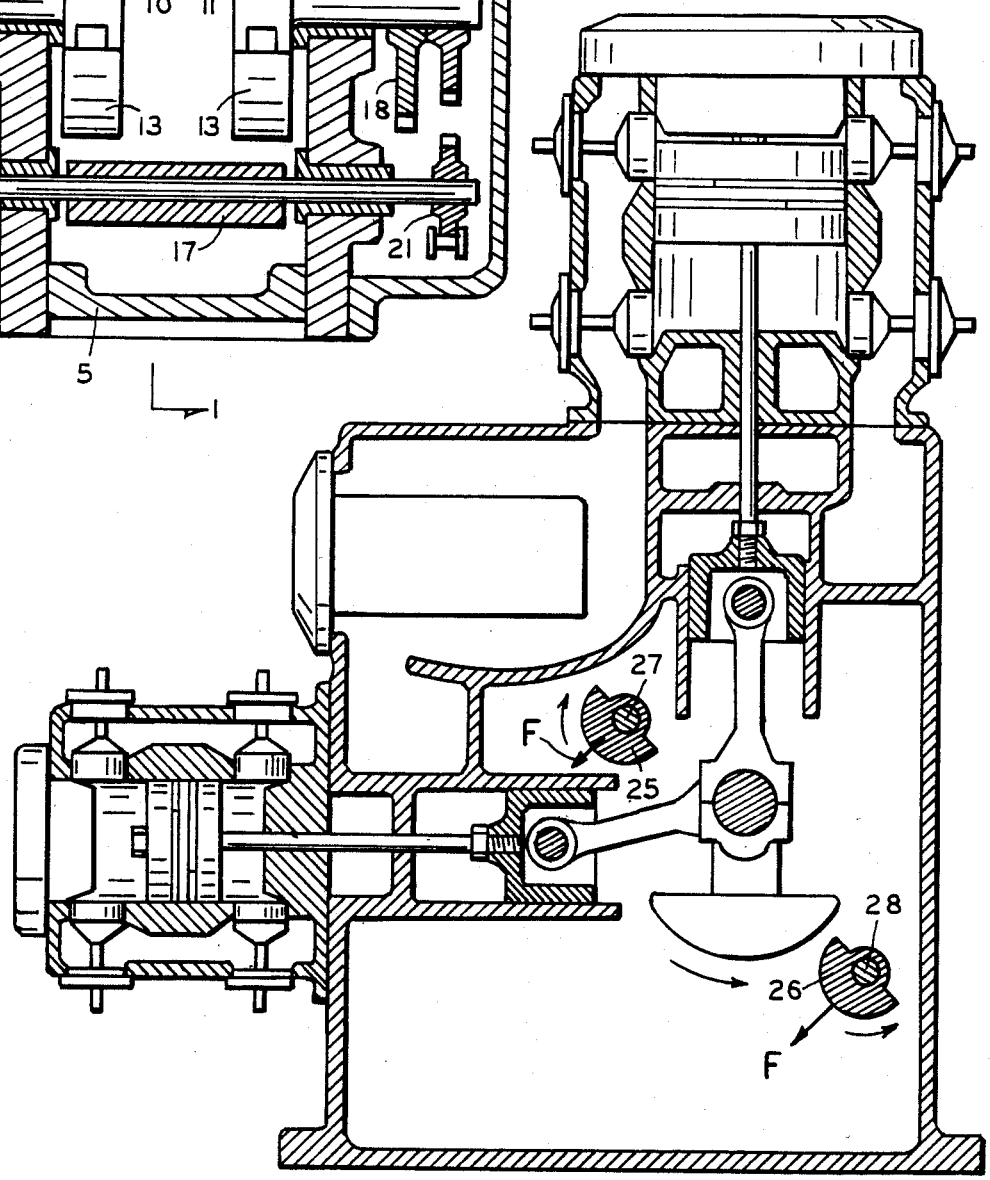
FIG. 4 is a section view of a large double acting air compressor incorporating the secondary balancer shown in FIGS. 1 to 3.

Referring to FIG. 3, the section view is taken through the axes of the crankshaft 1 and the two balance shafts 14 and 15. It is seen in FIG. 3 that all three shafts lie in a common plane (the paper) with their axes substantially parallel.

A large spur gear 18 (mounted on the end of the crankshaft) meshes with a half size pinion gear 19 mounted on balance shaft 14. A large sprocket 20 is also mounted on the crankshaft and a half size sprocket 21 is mounted on balance shaft 15. A chain or toothed belt 22 interconnects the two sprockets. It is thus seen that the two balance shafts are driven at twice crankshaft RPM and in opposite directions from each other. Item 23 is an enclosure cover.

GENERAL FORMULAS FOR PISTON ACCELLERATION AND RECIP INERTIA FORCE

The following formula is for the acceleration of a reciprocating piston in a crank-connecting rod mechanism. This formula can be found in most test books on the kinematics of machinery:

acceleration = $r\omega^2(\cos\theta + \cos 2\theta/N)$ where:
acceleration = inches per second per second
r = crank radius or throw-inches
$\omega$ = rotational speed of crankshaft-radians per second
$\theta$ = angle in degrees that the crankarm has advanced from top dead center.
N = ratio of con rod length to crank arm throw length.

The well known formula relating inertia force and acceleration is:
F = Wa/g where:
F = inertia force LBS.
W = reciprocating weight LBS.
a = acceleration = inches per second per second
g = gravity = 385 inches per second per second Referring to the first formula, the product $r\omega^2\cos 2\theta/N$ is the secondary acceleraton. Thus, if the length of the con rod is for example four times the crank radius, then the secondary inertia force would be one forth of the primary = still a formidable source of vibration.

Further, (referring to FIG. 2) the two secondary reciprocating forces $F_1$ and $F_2$ combine vectorally to exert a combined force greater than either force alone. Thus, it is desirable to also counterbalance the secondary reciprocating inertia forces in a two cylinder 90 degree Vee machine.

BALANCING IN FIG. 1

When two cylinders are set at 90 degrees relative to each other, (as in FIG. 1) then the primary reciprocating inertia forces are balanced by the main counterweights 13 as is well known. Only secondary forces (and no primary forces) are indicated in the various drawings.

In FIG. 1, the crankpin is located 45 degrees from the top dead center position for both pistons; and at this 45 degree position, the secondary inertia forces of each piston is zero (per the formula).

Thus, in FIG. 1, the reciprocating primaries are balanced by the main counterweights 13, the secondary reciprocating forces are zero, and the two balance weights 16 and 17 cancel each other.

BALANCING IN FIG. 2

Figure 2:
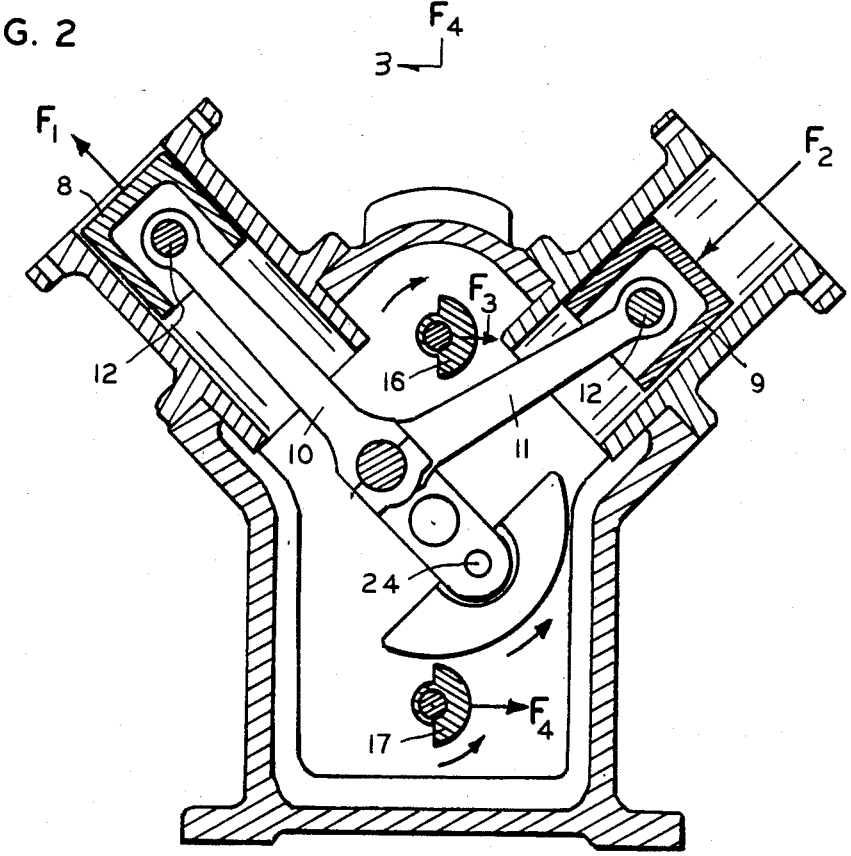
FIG. 2 is the same as FIG. 1 except the movable parts are shown in mode positions. This would be the best figure to use in case of publication.

FIG. 2 is identical to FIG. 1 except the crankshaft has rotated 45 degrees and the balance weights 16 and 17 have rotated 90 degrees.

The piston 8, wrist pin 12, and small end of connecting rod 10 exert the secondary inertia force $F_1$ in the direction shown and the force $F_1$ is maximum at top dead center (as shown in FIG. 2). Also, the other piston 9, wrist pin 12, and small end of connecting rod 11 exert the secondary inertia force $F_2$. At the crank position shown in FIG. 2, the force $F_2$ is also maximum and in the direction shown (as per the formula $a = r\omega^2(\cos 2\theta/N)$. In FIG. 2, the forces $F_1$ and $F_2$ combine vectorally to impose a shaking force equal to $(F_1+F_2)/\sqrt{2}$ which is larger than either $F_1$ or $F_2$ alone.

The equal size weights 16 and 17 exert centrifugal forces $F_3$ and $F_4$ so as to counterbalance recip inertia forces $F_1$ and $F_2$. All forces and weights are shown in the correct positions and directions for balancing.

For proper balancing, the following force relationships should be provided:

$F_1 = F_2$
$F_3 = F_4$ $F_3 + F_4 = \sqrt{F_1^2 + F_2^2}$

Thus, in both FIGS. 1 and 2 the primaries are balanced and the secondaries are balanced. In a similiar manner it can be shown that both the primary and the secondary reciprocating forces are counterbalanced throughout a full rotation of the crankshaft.

For best balancing, the two balance shafts should be located relative to the cylinder axes and the crankshaft substantially as shown. Just any location will not do. That is (for ideal location) one balance shaft should be centered inside the Vee and other balance shaft diametrically opposite and equidistant from the crankshaft. There must be at least two balance shafts as one is insufficient.

If desired, the pinion gear 19 and small sprocket 21 could be interchanged from their positions shown in FIG. 3. That is, pinion gear 19 could be placed on lower shaft 15; and small sprocket 21 placed on upper shaft 14. If this were done, it would also be necessary to hold the crankshaft still and rotate the two balance weights (16 and 17) 180 degrees from their positions shown in FIG. 1 so as to be directed radially inward instead of radially outward.

The main counterweights 13 are attached to their crankarms by pivot pins 24. This is described further under "REGARDING TORQUE REACTION".

As seen in FIG. 3, the balance weights 16 and 17 are long and slender (instead of small width and large radius) so as to minimize flywheel effect of same for a given static moment. This reduces the load on the gearing caused by small cyclic changes in rotative speed each rev of the crankshaft. Also, long slender balance weights would be less likely to cause torsional vibration in the whole system. Also, they fit better into the crankcase and the shaft center distance is less to clear the main couterweight. The balance weights shown have a ratio of length to outer radius exceeding four to one.

DETAILED DESCRIPTION OF FIG. 4

This shows a large double acting two cylinder air compressor having cross heads and cross head guides. The axes of the cylinders are at 90 degrees to each other and this is commonly known as the L machine as one cylinder is vertical and the other horizontal. Secondary balance weights 25 and 26 are mounted on their respective balance shafts 27-28 and are driven at twice the RPM of the crankshaft and in opposite directions from each other by means of positive toothed gearing—such as shown in FIG. 3. Thus, the reciprocating secondary inertia forces are counterbalanced the same as for FIGS. 1 and 2 by centrifugal forces F and F.

DETAILED DESCRIPTION OF FIGS. 5 AND 6

There are four cylinders 29 to 32 mounted in a 90 degree Vee. Two of the cylinders are mounted directly behind or in line with the other two. The crankshaft 33 has a double throw with two crankpins 34 and 35 disposed at 180 degrees from each other. Two connecting rods 36 are journaled to each crankpin so as to drive a reciprocable piston inside each cylinder.

Figure 5:
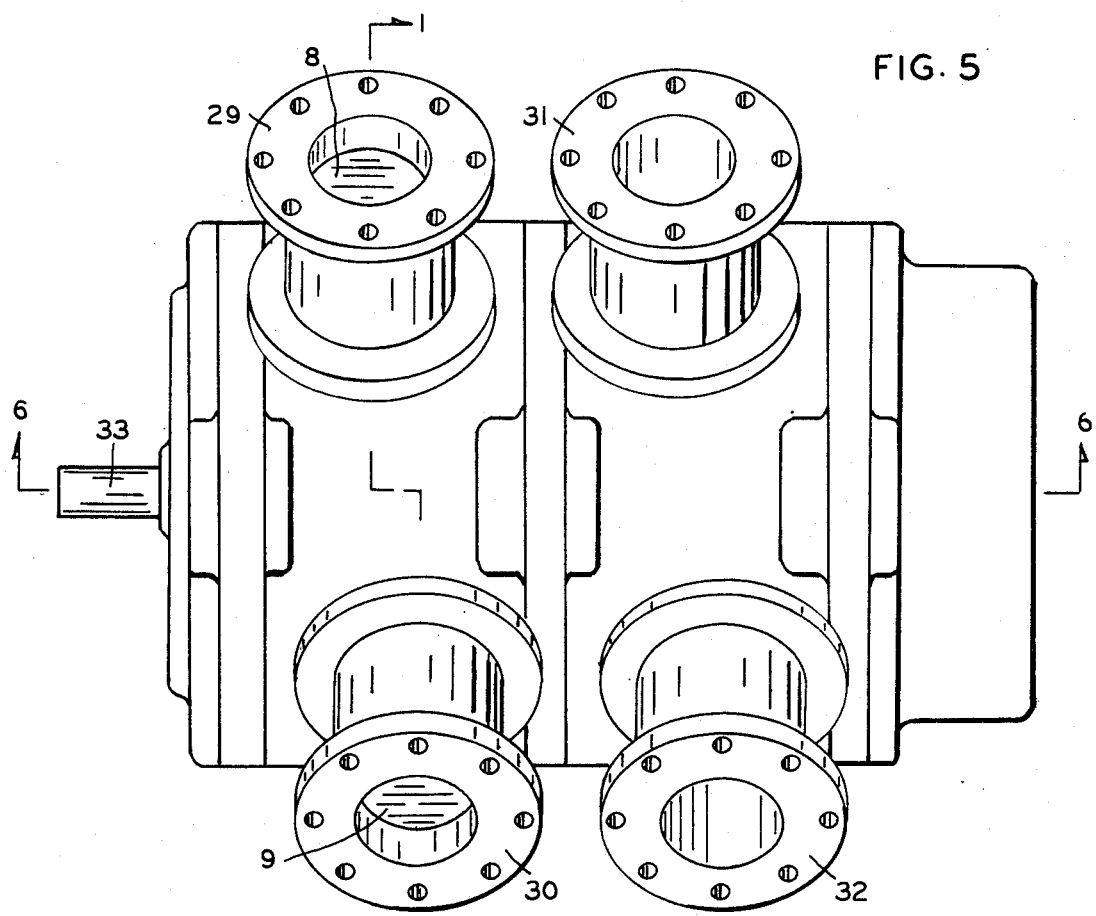
FIG. 5 is a top plan view of a four cylinder 90 degree Vee machine.
Figure 6:
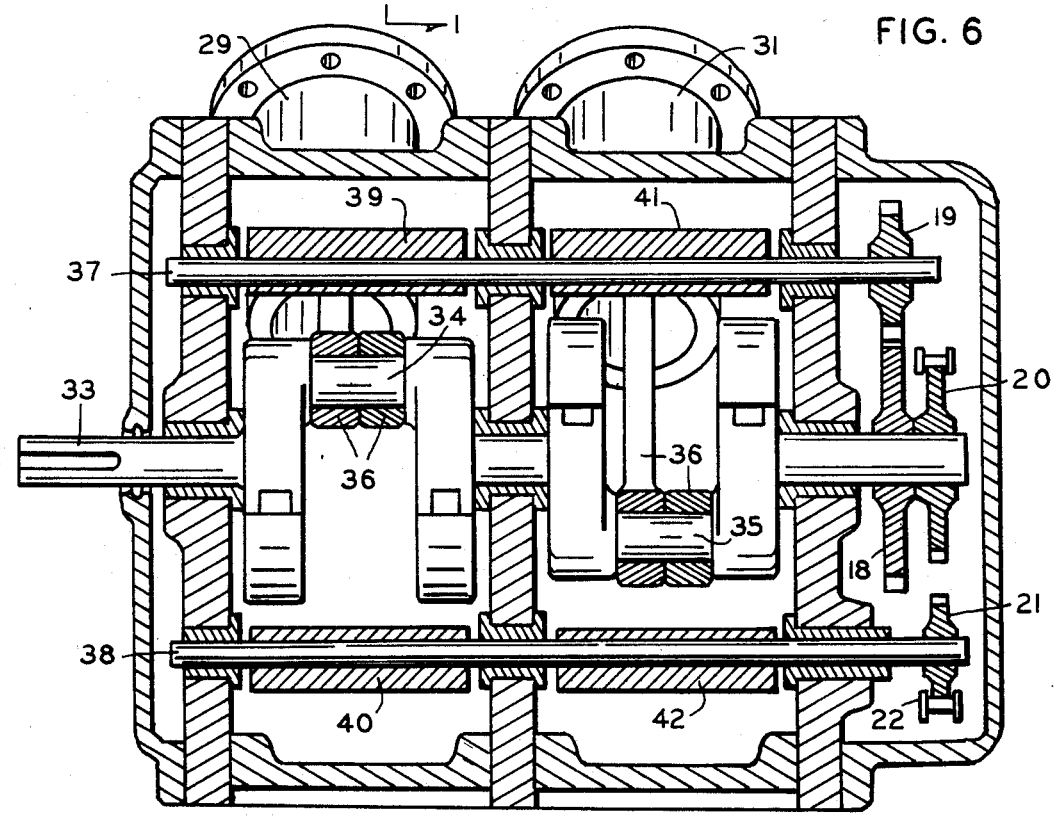
FIG. 6 is a section view taken along the lines 6—6 in FIG. 5.

Two balance shafts 37 and 38 are mounted parallel to the crankshaft, equidistant therefrom and all in the same plane as the crankshaft. Balance weights 39 to 42 are fastened to and rotate with the shafts at twice crankshaft speed. It is thus seen that only two balance shafts 37 and 38 serve a total of four cylinders 20 to 32. In FIG. 6, the weights 39 and 41 are oriented straight up (away from the crankshaft) and the weights 40 and 42 are oriented straight down (away from the crankshaft). The same orientation can be seen in FIGS. 1 and 3 wherein weight 16 is oriented straight up and weight 17 is oriented straight down. In fact, if a section view of FIG. 5 is taken (perpendicular to the crankshaft along the lines 1-1 in FIG. 5) it shall look exactly like FIG. 1.

DETAILED DESCRIPTION OF FIG. 7

Figure 7:
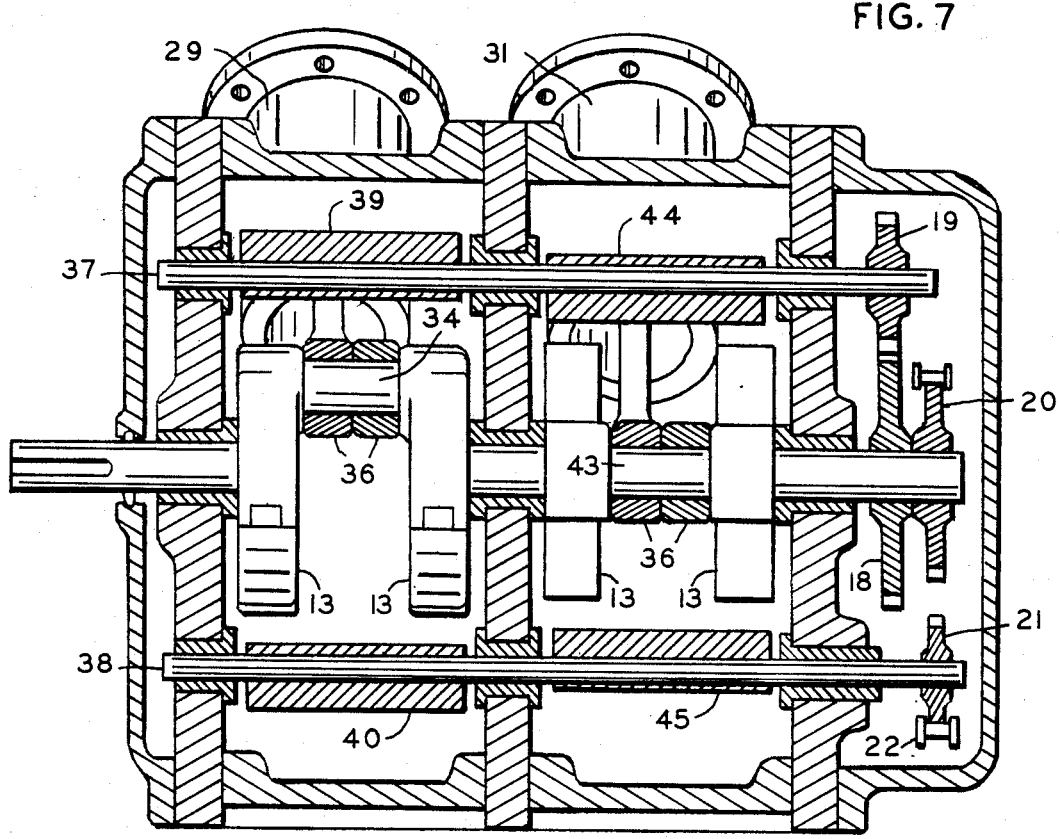
FIG. 7 is the same as FIG. 6 except one crank is 90 degrees out of phase with the other; and the balance weights are rephased to accommodate the change.

FIG. 7 illustrates a machine similar to FIG. 6 except the two crankpins 34 and 43 are disposed at 90 degrees relative to each other instead of being 180 degrees out of phase. The balance shafts and weights are the same except one pair of weights 44 and 45 are phased inward (toward the crankshaft) instead of outward. Gearing is the same. The housing and cylinders for FIG. 7 are identical to FIG. 5.

In FIG. 7, the crankpin 34 lies in the same plane as shafts 37 and 38. The crankpin 43 does not lie in the same plane as shafts 37 and 38 since it is 90 degrees out of phase with crankpin 34. For purposes of illustration, the section view cutting plain (for FIG. 7) is raised locally around crankpin 43 so as to illustrate same.

DETAILED DESCRIPTION OF FIG. 8

Figure 8:
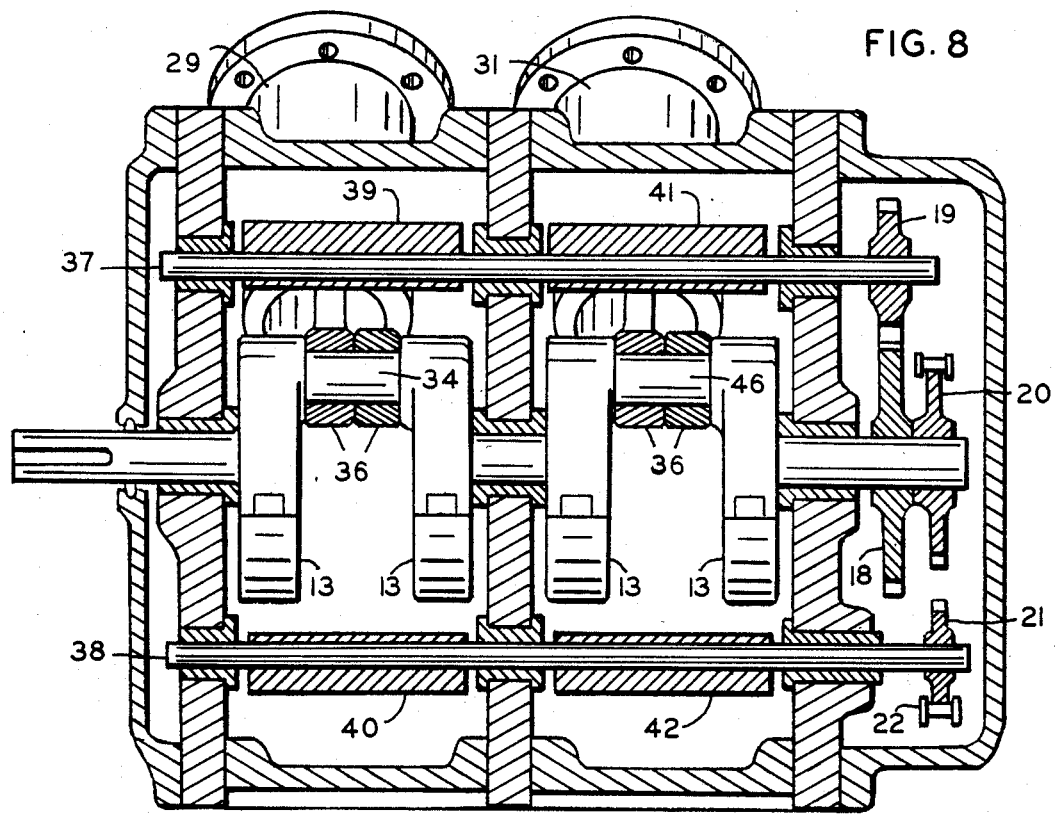
FIG. 8 is the same as FIG. 6 except the two crank pins are coaxial.

FIG. 8 illustrates a machine identical to FIG. 6 except the two crankpins 34 and 46 are coaxial instead of being 180 degrees out of phase. The same balance shafts, balance weights, and gearing is used in both FIGS. 6 and FIG. 8. The housing and cylinders for FIG. 8 are identical to FIG. 5. The gearing for FIG. 8 is identical to that in FIG. 6. The balance weights 39 to 42 in FIG. 8 are all oriented the same direction (radially outward from the crankshaft) as in FIG. 6.

DETAILED DESCRIPTION OF FIG. 9

Figure 9:
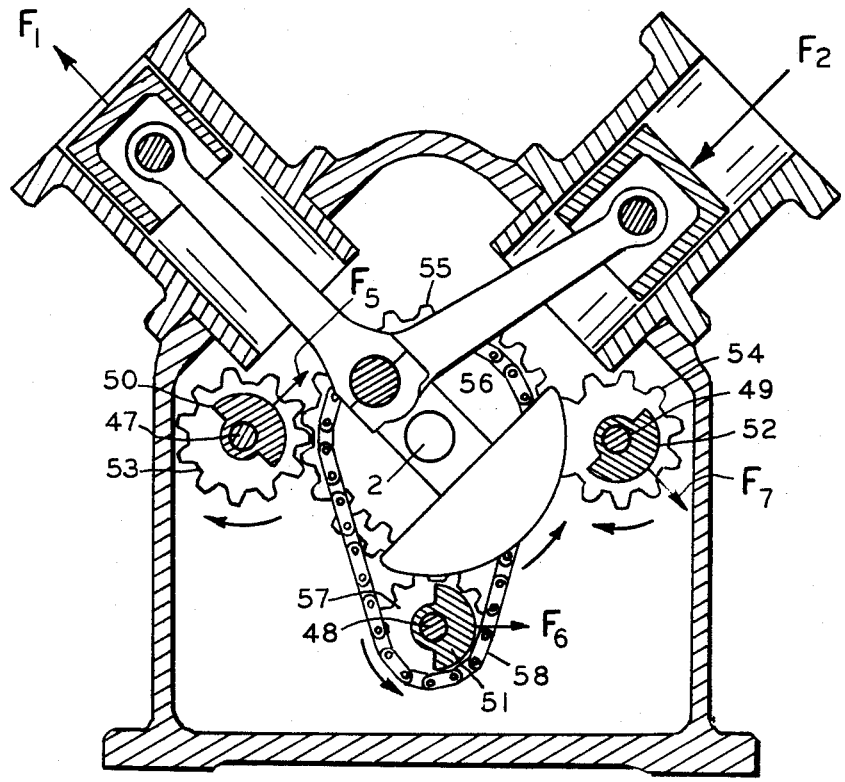
FIG. 9 illustrates another species of this invention which uses three balance shafts instead of two.

In some applications, it may be desirable to place all the counterweights in the crankcase (as in FIG. 9) and none at an upper location between the cylinders. FIG. 9 is similar to FIG. 1 except three balance shafts are used instead of two. The balance shafts 47, 48, and 49 are mounted parallel to the main bearing shaft 2 and equidistant therefrom. Balance weights 50, 51, and 52 are mounted on their respective balance shafts and rotate therewith. Pinion gears 53 and 54 are mounted on their respective balance shafts and rotate therewith. Twice larger gear 55 is mounted on the main shaft 2 so as to drive weights 50 and 52 in the direction shown. Shaft 48 and balance weight 51 are driven at twice crankshaft RPM by sprockets 56 and 57 and chain or toothed belt 58.

The forces $F_1$ and $F_2$ represent only secondary recip inertia forces. The balance weights 50, 51, and 52 exert centrifugal forces $F_5$, $F_6$, and $F_7$. For balancing, $F_1=F_2$ and $F_5=F_2/2$ and $F_7=F_1/2$, and $F_6=\sqrt{F_1^2+F_2^2}/2$. The balance weights 50, 51, and 52 are shown in FIG. 9 at their correct angular timed oriented locations for balance.

DETAILED DESCRIPTION OF FIG. 10

Figure 10:
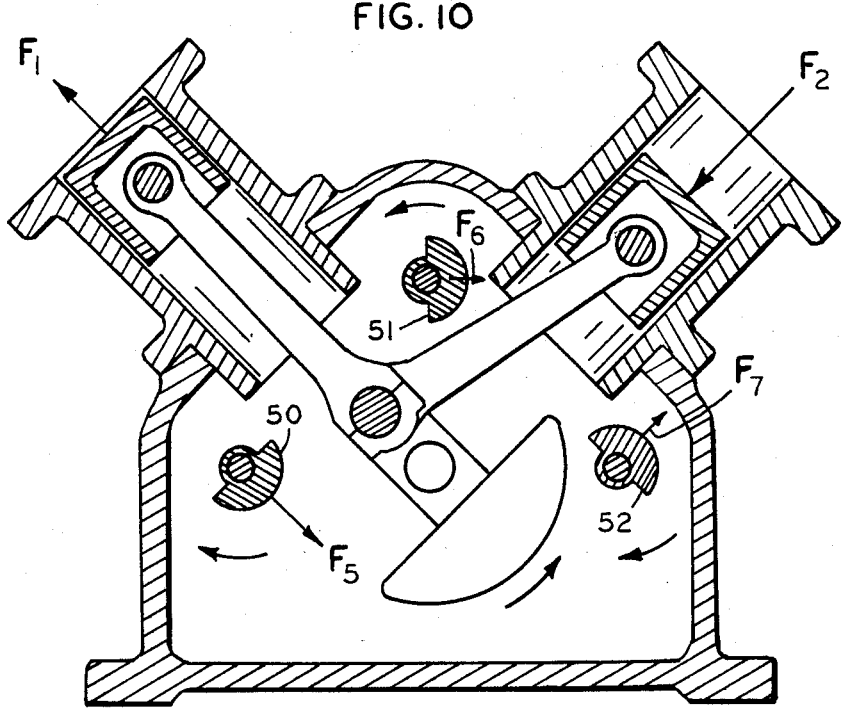
FIG. 10 is similar to FIG. 9 except one balance shaft has been relocated.

In some applications it may be desirable to have no countershafts below the crankshaft so as to have a compact crankcase at this location. FIG. 10 is similar to FIG. 9 except the balance weight 51 is placed above the crankshaft instead of below; and again all three balance shafts are equidistant from the crankshaft. For balance of the secondary forces, $F_1=F_2$, and $F_5=F_1/2$, and $F_7=F_2/2$ and $F_6=\sqrt{F_1^2+F_2^2}/2$. The balance weights are shown in FIG. 10 at their correct angular timed locations for balance.

Again, primary forces are not shown in FIG. 10 since they are counterbalanced by the main counterweight. Gearing for FIG. 10 would be the same as for FIG. 9 except sprocket 57 would be above the crankshaft instead of below.

DETAILED DESCRIPTION OF FIGS. 11 AND 12

Figure 11:
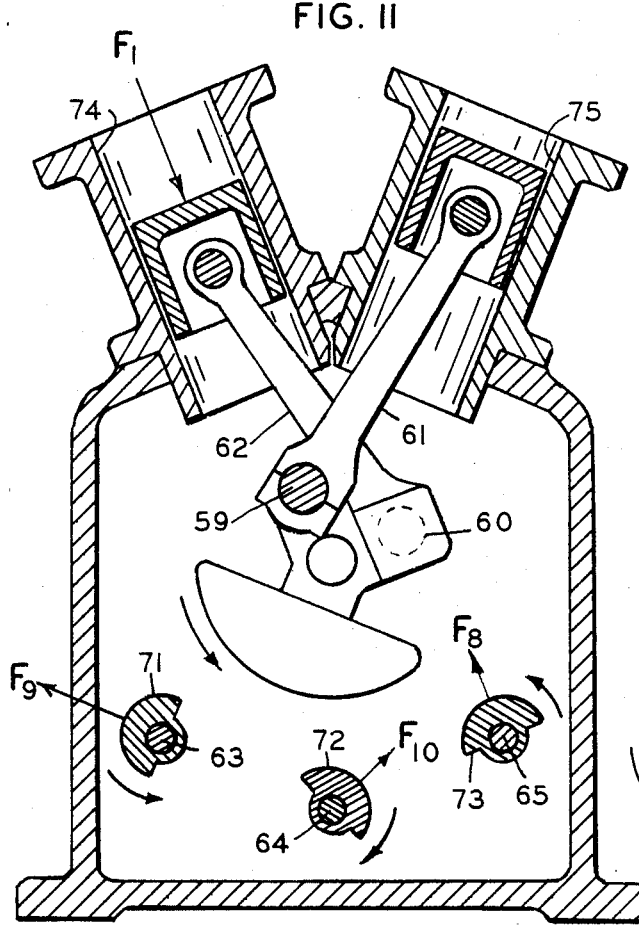
FIG. 11 illustrates another species of this invention wherein the Vee angle between cylinders is 45 degrees instead of 90.

FIG. 11 illustrates a two cylinder 45 degree Vee engine presently used in motorcycles. This engine has primary balance through the employment of offset crankpins 59 and 60 in which each con rod 61 and 62 rides on its own crankpin and the two crankpins are disposed at 90 degrees from each other. My improvement pertains only to secondary counterbalancing for the engine and not to the engine itself. In FIG. 11, three balance shafts 62, 64, and 65 are used to provide secondary balancing. I have tried to reduce this to only two balance shafts but have been unable to do so. Apparently, when the Vee angle between two cylinders is not close to 90 degrees, then it becomes necessary to use three balance shafts instead of two.

Figure 12:
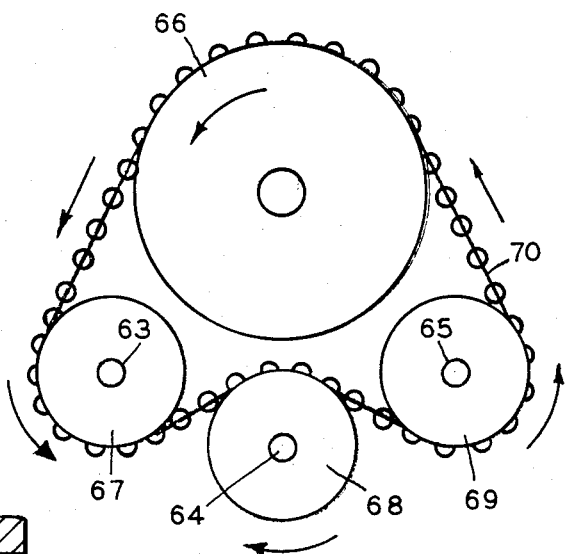
FIG. 12 illustrates a chain drive for the machine shown in FIG. 11.
Figure 13:
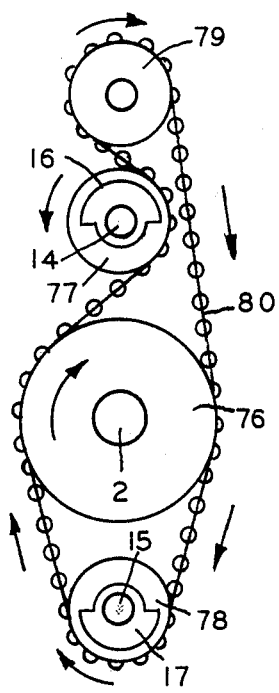
FIG. 13 is a schematic drawing which shows an alternate method of driving the two balance shafts shown in FIGS. 3 and 6.

The three balance shafts are driven at twice crankshaft speed in the directions shown by means of four sprockets 66 to 69 and a double sided toothed belt 70 (or a chain) as shown in FIG. 12.

The three balance shafts are located at equal distances from the crankshaft and are equally spaced each side of the extended centerlines of the two cylinders. Balance weights 71, 72, and 73 are mounted on the shafts. Let $F_1$ = maximum secondary inertia force of either reciprocating mass. Then $F_8=F_1/2$ and $F_9=F_1/2$ and $F_{10}=F_1 \sin 45°/2$ or $F_{10}=F_1 \sin 22.5°$. All balance weights (and their forces) are oriented as shown for proper balancing. Force $F_8$ is parallel to the centerline of cylinder 74. Force $F_9$ is perpendicular to the centerline of cylinder 75. Force $F_{10}$ is at 45 degrees to vertical and horizontal.

DETAILED DESCRIPTION OF FIG. 13 (SCHEMATIC DRAWING)

The large sprocket 76 is mounted on the crankshaft 2 and the two half size sprockets 77 and 78 are mounted on the balance shafts 14 and 15. Item 79 could be an idler wheel or a sprocket. The chain or double face toothed belt 80 interconnects all four sprockets so as to rotate the balance weights 16 and 17. The chain or toothed belt is also referred to as a flexible toothed element.

DETAILED DESCRIPTION OF FIGS. 14 AND 15 (SCHEMATIC DRAWINGS)

Figure 14:
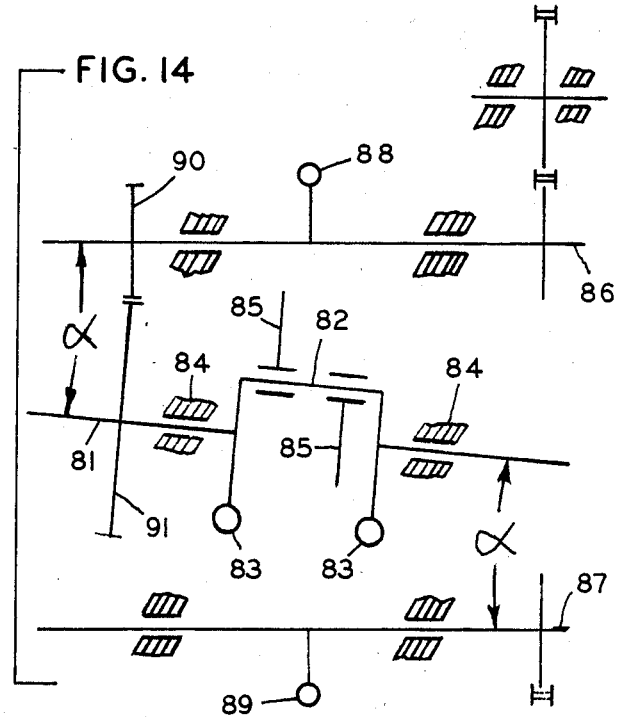
FIG. 14 is a schematic drawing of a less preferred variation of FIG. 3.
Figure 15:
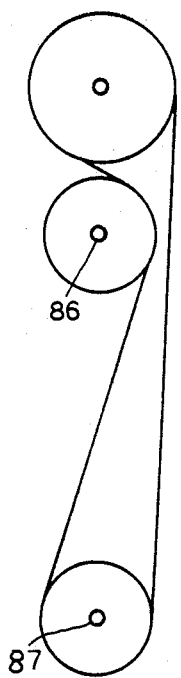
FIG. 15 is an end view of FIG. 14.

This is a less preferred species of my invention; and these Figs. are shown so as to illustrate scope of the invention. The crankshaft 81 has a crankpin 82, main counterweights 83, and is on bearings 84. Con rods are 85. Balance shafts 86 and 87 carry balance weights 88 and 89. The axes of the three shafts 81, 86, and 87 all lie in a common plane (the paper). The shafts 86 and 87 are mounted parallel to each other; but in FIG. 14, the two balance shafts are mounted at a small angle $\alpha$ relative to the crankshaft instead of being exactly parallel to the crankshaft. The angle $\alpha$ could be as large as 30 degrees and still work, but the whole arrangement becomes unwieldy this way. Parallel shafts are the best way to go. The gears 90 and 91 are beveled to accommodate the angle; and they drive the balance shaft 86 at twice crankshaft RPM. FIG. 15 shows a chain drive for driving shaft 87. The arrangement shown in FIG. 14 would counterbalance the secondary reciprocating inertia forces. FIG. 14 is less preferred than FIG. 3 because of more expensive gearing. Also, it is more expensive to provide bearings for shafts set at small angles than wherein the shafts are all parallel to the crankshaft. Applicant's claims are written so as to read on both FIGS. 3 and 14.

MODIFICATION NOT SHOWN

An alternate drive for FIG. 1 would be to place a larger gear on the crankshaft and a half size pinion gear on each balance shaft. A fourth (idler) gear would be double wide and would mesh with the larger gear in one plane and mesh with one pinion gear in a separate axially spaced plane.

REGARDING TORQUE REACTION

Referring to FIGS. 1 to 3, both the primary and the secondary recip inertia forces are balanced. The two connecting rods are close together side by side on a single crankpin and therefore the force couple due to such connecting rod spacing is very low. Therefore, the only remaining source of vibration is that due to torque reaction around the axis of the crankshaft. The crankshaft undergoes angular accelerations and decelerations each rev due to varying gas pressure on the pistons, varying secondary reciprocating inertia forces on the pistons, and the variation of torque due to crank position. Such acceleration forces are transmitted to the machine foundation by equal and opposite reaction. A simple prior way to greatly reduce torque reaction to a negligable amount is with a pendulous vibration absorber. One way this can be done is to mount the main counterweights 13 to the crank arms with pivot pins 24 so that the counterweights can undertake a slight pendulous motion relative to the crankshaft. During crankshaft acceleration, the pendulous absorber lags behind the crankshaft. During deceleration, it catches up and then leads; thus, smoothing out torque reaction transmitted to the machine foundation.

In the description and claims the words Vee/L mean the guideways or cylinders are disposed at an angle about the crankshaft instead of being in-line along the crankshaft. Cylinders are also guideways.

While the preferred embodiments of the invention have been disclosed, the invention is not limited thereto since it may be otherwise embodied within the scope of the following claims:

I claim:

1. In a reciprocating machine, the combination of a frame structure, a crankshaft mounted for rotation in said frame structure, two guideways fastened to said frame structure and directed radially outward from said crankshaft, said two guideways being disposed at an angle relative to each other about the axis of the crankshaft, a reciprocable member guided for reciprocation in each said guideway, a connecting rod interconnecting each reciprocable member to said crankshaft for respective reciprocative and rotary motion, at least one primary counterweight attached to said crankshaft and rotatable therewith, said primary counterweight serving to counterbalance the primary reciprocating inertia forces of said reciprocable members, at least two secondary balance weights mounted for rotation in said supporting frame on axes offset from the axis of said crankshaft, positive toothed gearing rotatably interconnecting said crankshaft and said secondary balance weights so as to drive the secondary balance weights at twice the RPM of said crankshaft, two of said secondary balance weights driven in opposite directions of rotation from each other, said secondary balance weights serving to counterbalance the secondary reciprocating inertia force of said reciprocable members, and wherein the improvement comprises; said secondary balance weights being mounted with their axes of rotation substantially parallel to the axis of rotation of said crankshaft, and wherein the angle between the two said guideways is 70 to 110 degrees, and wherein the axis of rotation of one said secondary balance weight is located inside said 70 to 110 degree angle, and wherein the axis of rotation of a second said secondary balance weights is located outside said 70 to 110 degree angle.

2. The combination specified in claim 1 wherein said positive toothed gearing consists of the following: a larger sprocket is mounted on said crankshaft and is rotatable therewith, a half size sprocket is attached to the first balance weight and is rotatable therewith, a second half size sprocket is attached to the second balance weight and is rotatable therewith, a wheel is located the other side of either half size sprocket from the larger sprocket, a flexible toothed element engages all three said sprockets and also bends around said wheel, said flexible toothed element engages said larger sprocket at two locations and disengages said larger sprocket at two locations, said flexible toothed element engages said larger sprocket and one of said half size sprockets on the front face of said flexible toothed element so as to drive the half size sprocket in the same direction as said larger sprocket, and said flexible toothed element engages the other half size sprocket on the back face of said toothed element so as to drive that half size sprocket in the opposite direction from that of the larger sprocket.

3. The combination specified in claim 1 wherein the said two guideways are disposed radially outward from the crankshaft in a Vee/L formation and wherein the improvement comprises: the number of said balance weights is equal to three, the first two said balance weights being located outside said Vee/L formation with one balance weight on each side of the Vee/L formation, the third said balance weight being located inside said Vee/L formation, said first two balance weights being adapted to rotate in the same direction, said third balance weight being adapted to rotate in the opposite direction from the first two, and the third balance weight having a larger total moment than either of the other two balance weights.

4. The combination specified in claim 1 wherein the axis of rotation of one of said secondary balance weights is substantially centered between the said two guideways, and the axis of rotation of a second said secondary balance weight is located on the other side of the crankshaft substantially opposite that of the first balance weight.

5. The combination specified in claim 4 wherein said crankshaft has a crankpin, one end of each said connecting rod is journaled to said crankpin, wherein the two said secondary balance weights are oriented as follows: when said crankpin is located midway between said guideways (as shown in FIG. 1), the force centerline of each balance weight lies substantially in a plane common to both the axis of the crankshaft and the axis of the crankpin, and further, the two said secondary balance weights oppose each other at this rotative position of the crankshaft.

6. The combination specified in claim 5 wherein the size of each said secondary balance weight is determined such that: if $F_1$ equals the maximum secondary inertia force of one said reciprocable member including the small end of its respective con rod, $F_2$ equal to the maximum secondary inertia force of the second said reciprocable member including the small end of its respective connecting rod, $F_3$ equals the centrifugal force of one said secondary balance weight, $F_4$ equal the centrifugal force of the second said secondary balance weight, then for optimum balance the following is substantially held: $F_1 = F_2$ and $F_3 = F_4$ and $F_3 + F_4 = \sqrt{F_1^2 + F_2^2}$.

7. The combination specified in claim 6 wherein said secondary balance weights are long and slender with a ratio of axial length to outer radius of at least four, and the advantages of such a ratio being lower loads on said positive tooth gearing, resistance to torsional vibration of the whole system, and small shaft center distance.

* * * * *